3,391,003
AGGLOMERATED PARTICULATE MATERIALS
AND METHOD FOR MAKING SAME
Kenneth Moffatt Armstrong, 158 Putney Ave., St. Lambert, Quebec, Canada; Walter Bushuk, 2498 Pinewood Drive, Winnipeg, Manitoba, Canada; and Gerald Joseph Dunne, 1242 Couvrette Ave., St. Laurent, Quebec, Canada
Continuation-in-part of application Ser. No. 406,770, Oct. 27, 1964. This application Nov. 22, 1966, Ser. No. 596,289
Claims priority, application Canada, Nov. 28, 1963, 890,145; Feb. 28, 1966, 953,466
22 Claims. (Cl. 99—56)

ABSTRACT OF THE DISCLOSURE

Free flowing, readily wettable, readily dispersable and/or soluble agglomerates composed of more finely divided, non-free flowing solid materials, for example powdered sugar particles bonded by dried yellow refinery syrup or invert sugar, flour, milk, starch and the like. The agglomerates are produced by suspending fine particles in a fluidized bed with heated gas, such as air, and atomizing an atomizable fluid agglomerating agent directly in the fluidized bed, the fluid wetting and agglomerating the particles, and the agglomerates being dried in a substantially instantaneous sequence of steps.

---

This is a continuation-in-part of our application Ser. No. 406,770, filed October 27, 1964, now abandoned.

The present invention relates to a novel method of agglomerating finely-divided, particulate materials to form agglomerated, free-flowing, non-caking, tempered products that will disperse or dissolve instantly in water without the formation of lumps and that have excellent shelf-like, remaining stable non-lumpy and, in the case of food products, flavorful over extending periods of time. Agglomerates are formed by collecting together in relatively large particles materials originally characterized by a fine state of subdivision, many of those materials being non-wettable or not readily wettable by water, others being subject to the formation of cakes or hard lumps on storage.

For example, ordinary wheat flour comprises very fine particles varying in diameter from less than one micron to about 149 microns. Because of the presence of relatively large amounts of fines, conventional flour is not free-flowing or readily dispersible when added to water. The reason for the slow dispersibility is that when water is added to the flour, the latter tends to form dough lumps instead of dispersing to form a uniform slurry. These characteristics hinder the use of flour in certain domestic and industrial applications. Similar difficulties arise with many other materials which are manufactured in a finely divided state. With products such as sugar agglomeration ensures a free flowing quality and materially reduces formation of lumps.

The process of the present invention provides a unique method of contacting materials such as dry powdered sugar with water, an aqueous solution of sugar or an aqueous solution of sugar and non-sugar materials in such a manner to cause the surfaces of the particles of powdered sugar to become sticky. It further provides a unique method of causing particles while in this state to immediately come into intimate contact and to adhere together to form random shaped aggregates. The process further provides a method by which these aggregates can be dried essentially immediately following their formation.

A primary objective of the process is, therefore, to provide a method of wetting, agglomerating and drying powdered products such as sugar almost instantaneously in a single treatment zone eliminating any need to transfer the wet sticky aggregates from an agglomerating zone to a drying zone.

It is also an object of the process to provide a method of agglomerating such products and drying them at a temperature sufficiently low to avoid any color change or other deleterious effects on heat sensitive materials which may be present.

The method according to the invention of preparing the free-flowing, readily-dispersible, readily-wettable and/or soluble, tempered and agglomerated products from non-free-flowing, more finely-divided, particulate materials generally comprises introducing non-free-flowing, solid, materials into a fluidized bed in an agglomerating chamber, the bed being maintained in a particulate fluidized state by means of fluidizing gas passing upwardly therethrough, discharging finely divided moisture in the form of an atomized liquid, liquid solution or liquid suspension directly into the particulate, fluidized bed in the chamber, thereby moistening the surfaces of the particles and causing the formation of agglomerates, and hardening the agglomerates by means of said fluidizing gas in most cases by evaporation of the liquid. The moistening, agglomerating and hardening follow in sequence but take place substantially instantaneously, and the agglomerates are then removed from the chamber, the temperature in the agglomerating chamber being non-injurious either to the materials being agglomerated or to the agglomerates themselves.

It should be clearly understood that while the moistening, agglomerating and drying take place in that order, each succeeding step follows its predecessor with such great rapidity that the particles are moistened and agglomerated and the agglomerates dried almost instantaneously.

The process of the invention can be applied to a very large number of materials such as farinaceous substances, sugar materials, milk powders, comminuted cheese materials and so on. Generally, the dry material which is fed into the agglomerating chamber may be almost any finely divided solid material or mixture of solid materials which can be handled mechanically and fed continuously into the chamber and which can be fluidized.

As is known, fluidization requires that the solid material must be made up of particles which are reasonably uniform in size and density. For example, it is impossible to fluidize large stones and sand under the same conditions. Also it is necessary that the solid material disperse into more or less discrete particles when it enters the fluidized bed, if successful fluidization is to be maintained. If, for example, the material is wet and sticky and remains in large clumps of relatively high density the clumps will sink to the bottom of the bed, resulting in an unsatisfactory condition unless an extremely high air flow rate is used which in turn would cause any fine particles present to be carried out of the chamber in the exhaust air. These principles are well known to those skilled in the art and are described, e.g. in Kirk-Othmer, Encyclopedia of Chemical Technology, 2d, Ed., vol. 9, pp. 398 et seq.

The wetting agent or agglomerating agent which is introduced into the fluidized bed is another aspect of the process where a wide variety of materials can be accommodated. There are also a number of ways in which the agent may function.

(1) The wetting agent may be any liquid which, when it contacts the material in the bed will cause the particles to become tacky or sticky and adhere together in clusters by solubilizing part or all of the material or otherwise transforming it to create this condition, examples being the addition of water to cheese, water to flour, water to sugar, alcohols or other organic solvents to appropriate materials.

(2) The wetting agent may be a solution or suspension of some ingredient in a liquid, so that said ingredient will itself perform the bonding function and, therefore, make it possible to agglomerate materials, particularly inert materials, which could not be agglomerated by a liquid which would be practical or economical to use and which would have the properties necessary to solubilize or otherwise make the particular material sticky as referred to above, for example the starch product agglomerated according to Example 8 by means of a cooked starch solution.

(3) The wetting agent may be a material which when heated becomes a liquid which performs the functions described in (1) or (2) and, by a modification of the process in which a cool gas is used to fluidize the material, the wetting agent would be caused to solidify after it contacts the material in the bed, thereby causing agglomerates to form and be held together by the solidified agglomerating agent, for example the addition of high melting point shortening or fat to flour products to make free flowing baking mixes. In this case, hardening takes place by solidification of the agglomerating liquid rather than by its evaporation.

(4) The wetting agent may be a combination of one or more materials in the form of a liquid mixture which may be combined with the powdered material fed into the process. One or more of the individual materials in the combination may or may not play a part in the agglomerating function, but it may become incorporated into the agglomerates instead of being evaporated by the fluidizing gas. Thus, the process provides a means of combining materials while simultaneously producing an agglomerated product which in many cases may be unique, the product of Example 4 being a case in point. The wetting agent may also provide a means of combining materials, which are not readily available in a dry form, with powdered materials and obtaining a dry free-flowing product. Since fluidized bed is an efficient and gentle means of drying, many materials which would be very difficult to dry by themselves can be combined in controlled proportions with other materials in the agglomerated product and dried therein, as in the case of the brown sugar of Example 2. A further example of this embodiment would be the addition of a puree of fruits or vegetable to flour or other material to prepare a flavored product which could be incorporated in baking mixes or other food products. In this way the fruit or vegetable flavor would be available in a dry form which would rehydrate well and in which the flavor and other desirable properties would be retained to a maximum degree. It is obvious therefore that, by using this embodiment, the materials which can be added to a product by including them in the wetting or agglomerating agent are almost limitless. Agglomerating agents may have many different functions, in addition to formation of agglomerates, such as adding to the flavor, color, texture and other properties of food products or they may be reagents or catalysts which would promote some reaction at the time they are added or at the time of use.

The agglomerating liquid is introduced directly into the fluidized bed, i.e. between the top and bottom of the bed, i.e. through one or more atomizing nozzles in the walls of the agglomerating chamber. That is, the liquid mass is first forced to assume an unstable, free-flowing configuration of large surface area. This is accomplished by imparting to it kinetic energy which causes it to flow through some device to form filaments or liquid sheets which creates such friction with the gas phase as to tear off filaments or sheets originating at ripples on its surface. Because of surface tension the configuration of large surface area is unstable, and, on undergoing disturbances, some of which are more probable and speedier than others, it breaks up into a drop system of smaller surface area. A preferred system is gas atomization. This comprises feeding a liquid mass slowly from a feed tube where it is picked up by a high velocity gas stream and shattered into small drops. High velocity atomization from orifice nozzles produces a similar effect by a large relative velocity between a liquid and a gas. Typical equipment is well known to those skilled in the art and described, e.g. in Kirk-Othmer's Encyclopedia of Chemical Technology, vol. 12 (1954), especially at pp. 714–721.

A variety of nozzle designs will perform satisfactorily, providing they will atomize the agglomerating agent to the desired degree, but the type known as the two-fluid nozzle has been found to be particularly useful. Two-fluid nozzles, in which a gas such as air, steam or nitrogen is used as the second fluid, and so designed that the gas jet completely surrounds the liquid jet, are particularly adaptable because a wall of gas surrounds the liquid until it has cleared the nozzle by a sufficient distance to prevent liquid from contacting the surface of the nozzle exposed to the product which, if permitted to occur, might cause the nozzle to become fouled. Two-fluid nozzles further provide an advantage in that, by varying the gas pressure to the nozzles, the size of droplets contained by the spray can be varied without altering the liquid flow rate. This provides one of the most effective means of controlling the size of the agglomerates formed in the fluidized bed. The atomizing nozzle or nozzles project into or are immersed in the fluidized bed and on that account the jet or spray of agglomerating fluid delivered or discharged into the bed within the chamber increases or enhances the turbulence. In addition the pressure of the gas used to atomize or spray the agglomerating fluid determines the size of the fluid droplets which in turn controls or determines the extent of agglomeration and hence the size of the agglomerates themselves. If the gas pressure at the nozzle is too low the fluid droplets will be relatively large and will cause the formation of unsuitable over-sized agglomerates. On the other hand if the gas pressure is too high the agglomerating fluid will be so finely atomized or dispersed that little or no agglomeration will take place. It is therefore an essential feature of the invention to maintain an optimum pressure of gas from the nozzles. Nozzles requiring from 0.5 to 5.0 s.c.f.m. of air per nozzle at pressures ranging from 25 to 100 p.s.i.g. have been employed successfully. However higher or lower flow rates and pressures can be utilized. In any event, the droplet size should be in the range about 10 to 250 microns. In the case of liquids of low viscosity, e.g. water, it is preferred to use smaller droplets, i.e. about 10–100 microns, whereas with more viscous liquids, larger drops are suitable.

It is an important and significant part of the invention to discharge the agglomerating agent or liquid directly into the fluidized bed of solids in order that agglomeration may be effected most advantageously and in order to enhance the turbulence of the bed. Under no circumstances must the stream of agglomerating liquid be atomized or delivered over the top of the bed as such a form of delivery seriously hampers or destroys turbulence and renders virtually impossible the formation of acceptable agglomerates.

Both the agglomerating agent and the gas should be supplied to the nozzles at a temperature which will maintain the surfaces of the nozzle exposed to the fluidized bed at approximately the same temperature as the bed, to prevent condensation of vapor on the nozzle surfaces, which might cause material to adhere to them and result in fouling of the nozzles. The temperature of the agglomerating agent will not be more than about 50° F. lower, and preferably not more than 10° F. lower, than the bed temperature, though it may be higher if desired.

The process of the invention will be described and illustrated on the basis of several examples and by reference to the attached drawing, FIGURE 1 of which represents a flow diagram and shows the process as a continuous operation following start-up, and in which.

The process according to the invention is particularly applicable to the production of dry, free-flowing, agglomerated sugar products, and will be described for that application in connection with FIGURE 1, as well as with other products such as a flavored flour product, a whole milk product, a cheese product, a skim milk product and a starch product.

The product obtained from sugar will have a composition of matter within the following ranges, and here the term sugar does not necessarily refer to sucrose but includes all types of sugars:

| | Percent |
|---|---|
| Sugar | 50–100 |
| Non-sugar materials | 0–50 |

It will be understood that certain variations in the operating conditions will be necessary when starting up, prior to normal operating conditions being attained.

Figure 1:
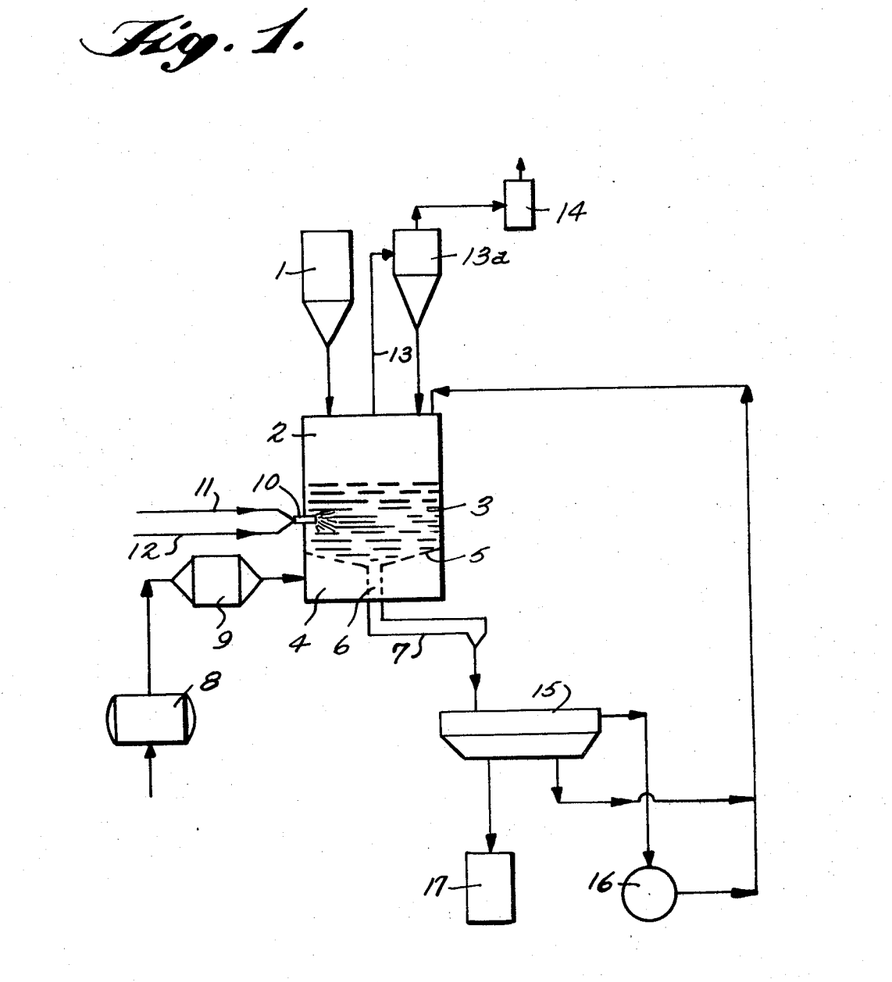

Referring to FIGURE 1, powdered sugar, or any other desired pulverulent material such as the materials of the examples, is continuously fed from supply hopper 1 to agglomeraitng chamber 2 at a rate which will maintain the desired product level in the chamber. The sugar, where sugar is to be agglomerated, may be of any desired purity; the main requirements are that it be a powder substantially all of which will pass an 80 mesh testing sieve and which is dry enough to be conveniently handled in mechanical equipment and disperse into discrete particles when it enters the fluidized bed 3. The material in the bed is maintained in a fluidized state by passing heated air or a heated neutral gas such as nitrogen through pump 8, heater 9, plenum chamber 4 and diffuser plate 5 at a rate in excess of that required to fluidize the material. For most sugar products, depending upon the percentage and size of the agglomerates contained by the material in the fluidized bed, it has been found that 25 s.c.f.m. (standard cubic feet per minute) of air per sq. ft. of diffuser area is the minimum which will maintain the bed in a fluidized state. Where desirable or necessary much higher gas or air flow rates may be used, but in all instances, as for all materials useful in this process, the flow rate should be the maximum which can be employed without causing an excessive amount of product to be carried out of the chamber by the exhaust air. Experience has shown that an air flow rate of up to 100 s.c.f.m. per sq. ft. of diffuser area is practical.

As the fluidizing gas passes through heater 9 it is heated to a temperature not exceeding about 400° F. the temperature being controlled to ensure that the finished product will contain the required optimum moisture content. That is, its relative humidity is reduced by heating, to accelerate drying, but is not so low that the product must be rehumidified.

After passing through the fluidized bed the gas leaves the agglomerating and drying chamber through a duct 13 located in the top of the chamber and leading to dust co'lector 13a. The latter may be any one of a number of commercially available designs. The air or inert gas is exhausted from the dust collector by blower 14 which is so designed and regulated as to maintain a minimum negative pressure of about ½″ of water, for example, in the agglomerating and drying chamber above the fluidized bed. Material recovered from the gas by the dust collector is returned directly to the agglomerating and drying chamber through a suitable seal arrangement.

An agglomerating agent is introduced into the fluidized bed through a series of nozzles suitably located around the circumference of the agglomerating and drying chamber, one such nozzle being designated as 10. The agglomerating agent may be a pure liquid such as water, or a solution, slurry or emulsion in water of any material which it may be desirable to add. Such materials may include sucrose, glucose, dextrose, invert sugar, artificial sweeteners or non-sugar material, individually or in any combination, the only requirement being that the material be prepared in the form of a solution, slurry or emulsion which can be passed through the atomizing nozzles satisfactorily. The agglomerating agent is fed to the nozzle or nozzles at a uniformly controlled predetermined rate based on the quantity of liquid that at a given chamber temperature and a given flow-rate for the bed-fluidizing agent will be required to effect satisfactory agglomeration and that in addition can be or must be evaporated in order to yield agglomerates of the size, composition and properties desired for the finished product. Flow rates ranging from a few ounces to several gal'ons per hour per nozzle can be accommodated, depending on the material being treated.

The water contained in the agglomerating liquid is immediately evaporated and carried off in the fluidizing air exhausted from the chamber.

A mixture of agglomerated and unagglomerated material is continuously withdrawn from the fluidized bed in the agglomerating and drying chamber through discharge duct 6 and screw conveyor 7, the conveyor being equipped with a variable speed drive to permit control of the discharge rate. It has been found that, depending on a number of conditions such as the size of the agglomerates required in the finished product, composition of the agglomerating agent, particle size and composition of the powdered sugar or other material fed into the agglomerating and drying chamber, there is a discharge rate which results in optimum operating efficiency. That rate is related to the percentage of agglomerates contained in the material as it is discharged, and in general the optimum flow rate has been found to exist when the percentage of agglomerates large enough to be retained on an 80 mesh testing sieve amounts to 60–70% by weight of the total discharge.

The product is then conveyed by conventional means to sifter 15 which is equipped with two decks of sieves suitably sized to select those agglomerates within the size range desired in the finished product. Oversized agglomerates are then conveyed to mill 16 where they are reduced to approximately the size desired in the finished produce and returned to the agglomerating and drying chamber along with the undersized particles or powder recovered from the sifting operation.

Figure 2:
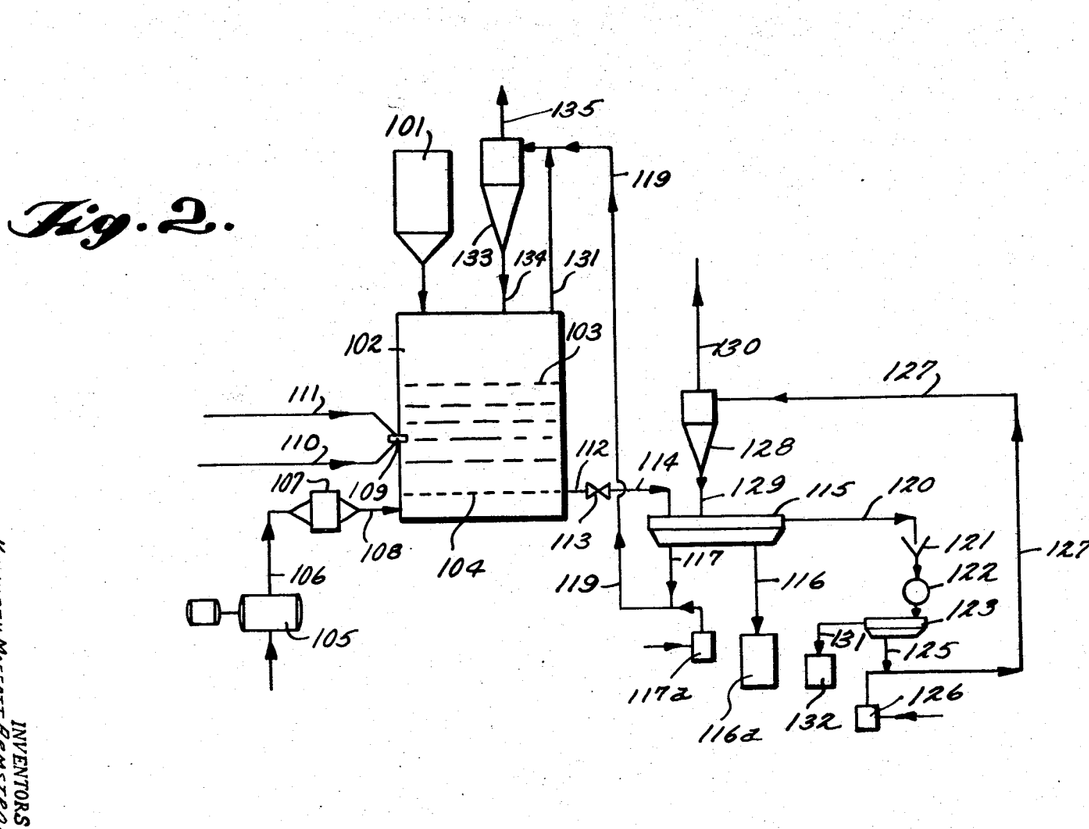
FIGURE 2 is a flow diagram showing another embodiment of the process.

Another form of apparatus useful for wheat flour is illustrated in FIGURE 2.

Referring more particularly to the drawing, 101 designates an overhead hopper from which the wheat flour is fed into an agglomerating and drying chamber 102 to initially fill said chamber to a predetermined level indicated at 103. The flour is then put into a fluidized-bed condition by heated compressed air which is fed into the bottom portion of chamber 102 to flow upwardly through a diffuser plate 104. The compressed air is supplied to chamber 102 from a motor-driven air pump 105 through line 106, heater 107 and line 108. The velocity and temperature of the compressed air are controlled by regu'ation of the pump 105 and heater 107.

When the flour in chamber 102 is completely fluidized, water, in the form of fine sprays, is introduced into chamber 102 at suitable points above diffuser plate 104 by means of atomizing nozzles 109. Water and atomizing air are supplied to nozzles 109 through water line 110 and air line 111. The rate of water addition through nozzles 109 is controlled to apply approximately 5 to 30 pounds of water per 100 pounds of flour processed. The flour particles become sticky and form aggregates or agglomerates of various sizes and shapes as soon as they come in contact with water and other flour particles. However, the added water is almost instantly removed from the aggregates or agglomerates by the continuous upward flow of warm air through the fluidized flour bed.

Aggregates and other flour particles are withdrawn from the lower portion of chamber 102 through line 112, valve 113 and line 114 and delivered to the usual arrangement of sieves 115 where they are sieved to give an aggregated product of the desired particle size and uniformity, said product being transferred from the sieves 115 through line 116 to a suitable receiver 116a.

The throughs or fines are returned from sieves 115 to chamber 102 through return lines 117 and 119 to which a blower 117a is suitably connected.

Oversize or coarse particles are passed from sieves 115 through line 120 to a hopper 121 and eventually to a pulverizer 122 from which the pulverized material is delivered to a sifter 123. The throughs or fines are transferred from sifter 123 to the product sizing sieves 115 by means of line 125, blower 126, line 127 and cyclone collector 128, the latter being connected to sieves 115 by line 129 and having an exhaust line 130.

Oversize or unpulverized coarse particles are transferred from sieve 123 through line 131 to a suitable receiver 132 to be used for other purposes.

The fines which are returned from sieves 115 to chamber 102 through return lines 117 and 119 pass through a cyclone collector 133 which is connected to said chamber by line 134 and is provided with an exhaust outlet or line 135.

The flow of flour through chamber 102, the rate of water addition, and the velocity and temperature of the flour bed fluidizing and drying air are so adjusted as to give the maximum yield of product of desired moisture content.

Throughout the disclosure several evaluation methods are referred to as follows:

Mesh analysis.—United States Bureau of Standards sieves were used for all mesh analyses. The desired series of sieves were stacked in their respective order in the series, with the one having the largest openings at the top. A 100 gm. sample of the material to be tested was placed on the upper sieve and the sieves placed on a Tyler Sieve Shaker for 5 minutes. The material on each sieve was then weighed and the weight reported as a percentage of the total weight of material accounted for one the sieves and in the pan under the finest sieve.

Bulk density.—Bulk density values were determined by pouring a quantity of the material to be tested through a standard powder funnel into a glass receiving-dish, the exact capacity in cubic centimeters of which was known, until the dish overflowed. A spatula having a straight edge was then carefully drawn across the top of the dish, to remove excess material. The dish and contents were weighed and the weight of material calculated by deducting the weight of the dish. The bulk density is reported as grams per cubic centimeter.

The funnel used was a standard 60 degree glass powder funnel having a diameter of 96 mm. at the top, height 102 mm. overall, stem diameter 13 mm. inside. The funnel was positioned directly over the dish with the lower end of the stem being 37.5 mm. above a plane extending across the upper edge of the sides of the receiving dish. The receiving dish was a glass crystallizing dish having an inside diameter of 70 mm. and inside depth of 50 mm.

Dispersing time.—A 400 ml. low form Griffin beaker was filled to approximately one inch from the top with water at 68° F. (except where otherwise specified) and a teaspoonful of the material to be tested carefully placed on the surface of the water. The dispersing time was reported as the number of seconds required for all of the material to sink below the surface of the water.

Flowability.—100 grams (except where otherwise specified) of the product to be tested was placed in a standard powder funnel as described under bulk density test. A stopper was fitted into the lower end of the funnel stem to prevent the material from flowing out until desired. The stopper was then removed and the time required for all of the sample to discharge from the funnel reported as the flowability in seconds.

The following specific examples embody some of the preferred applications of the invention:

Example 1.—Icing sugar 80 lbs. of powdered refined sugar were fed into the agglomerating chamber 2 and brought into a fluidized state by admitting heated air to the chamber through the diffuser 5 at a rate of 60 s.c.f.m. per sq. ft. of diffuser area. 40 lbs. of a 50% solution of cane sugar, prepared by dissolving 20 lbs. of refined sugar in 20 lbs. of water, was sprayed into the fluidized bed through two-fluid nozzles illustrated at 10, utilizing air as the second fluid, over a period of 190 minutes. The temperature of the air entering the plenum chamber below the diffuser was about 221° F. and the temperature of the product in the agglomerating chamber was about 155° F.

The following results of tests which were performed on the product as it was recovered from the agglomerating chamber show that it was dry, agglomerated and free-flowing, at least 95% of the agglomerated product remaining on a 120-mesh screen and the moisture content being less than 1.0%. The following shows particulars before and after agglomeration:

| | Powdered Sugar Fed Into Agglomerating Chamber | Product Recovered From Agglomerating Chamber |
|---|---|---|
| Mesh Analysis: | | |
| +40, percent | 0 | 39.4 |
| −40+120, percent | 1.3 | 58.0 |
| −120, percent | 98.7 | 2.6 |
| Moisture, percent | 0.04 | 0.25 |
| Bulk density, gms./cc | 0.56 | 0.55 |
| Flowability, seconds | (¹) | 5.5 |

¹ Would not flow out of funnel.

To demonstrate non-caking properties of a product having a particle size range which would be suitable for commercial use, the material recovered from the agglomerating chamber was sifted through a 12 mesh wire sieve to remove oversized agglomerates and over an 80 mesh wire sieve to remove small agglomerates. The oversized agglomerates were milled and re-sifted. In this way a minus 12 mesh plus 80 mesh fraction was recovered amounting to 80 lbs. per 100 lbs. of product recovered from the agglomerating chamber, the remainder being fine agglomerates which may be packaged directly or returned to the agglomerating chamber for further processing.

Approximately ½ lb. of the minus 12 plus 80 mesh fraction was placed in a glass jar, Sample A, which was tightly sealed. As a control approximately a ½ lb. sample of the powdered sugar fed into the chamber was also placed in a glass jar having a tight fitting cover, Sample B. The two jars were set aside in a room at about 76° F. and the contents examined periodically. The following descriptions of the condition of the contents of each jar when examined indicate clearly that the product produced by the process described remains uncaked and free-flowing during storage for a much longer period than the unprocessed powdered sugar.

| | Sample A | Sample B |
|---|---|---|
| Days Storage: | | |
| 11 | Free-Flowing | Product set slightly, some lumps when agitated. |
| 25 | do | Product set, many lumps when agitated. |
| 31 | do | Product caked. |
| 42 | do | Product caked to form one solid mass. |

Similarly 34 lbs. of the minus 12 plus 80 mesh fraction was placed in a polyethylene bag having a thickness of approximately 2 mils inside a fibre drum and stored at normal room temperature. After 63 days storage the container was opened and the product examined. It was found to be free-flowing, identical in this respect to its condition when placed in the container.

Example 2.—Brown sugar 300 lbs. of powdered sugar were fed into the agglomerating chamber and fluidized by admitting heated air to the chamber through the diffuser at a rate of 55 s.c.f.m. per sq. ft. of diffuser area. 90 lbs. of yellow refinery syrup consisting of 47.7 lbs. sucrose, 8.3 lbs. invert sugar, 4.6 lbs. of organic non-sugar solids, 28.9 lbs. water and having an ash content of 5.2%, pH 6.3, colour 6000 units, was atomized into the fluidized bed over a period of 6½ hours. The temperature of the air entering the plenum chamber was 288° F. and the temperature of the product in the agglomerating chamber was 159° F. The agglomerated product recovered from the chamber was sifted through a 12 mesh sieve and over an 80 mesh sieve and 265 lbs. of finished product recovered. At least 95% of the product remained on a 120-mesh screen and the moisture content was less than 1.0%.

The following test results and analysis demonstrate that the powdered sugar fed to the agglomerating chamber and the yellow refinery syrup were combined to produce in a dry form, a free-flowing, agglomerated sugar product similar to soft brown sugar in flavor, color and composition.

|  | Powdered Sugar Fed into the Agglomerating Chamber | Product Recovered | A Typical Commercial Soft Brown Sugar |
|---|---|---|---|
| Mesh Analysis: |  |  |  |
| +12, percent | 0 | 0 |  |
| −12+80, percent | 0 | 98.4 |  |
| −80+120, percent | 1 | 1.1 |  |
| −120, percent | 99 | 0.5 |  |
| Moisture, percent | 0.04 | 0.24 | 3.4 |
| Bulk Density, gms./cc | 0.56 | 0.45 |  |
| Flowability, sec | (1) | 6.0 | (1) |
| Sucrose, percent | 99.9 | 94.69 | 91.0 |
| Invert Sugars, percent | <0.05 | 2.40 | 2.7 |
| Total Sugar, percent | 99.9 | 97.09 | 93.7 |
| Ash, percent | <0.5 | 1.30 | 1.5 |
| Organic Non-Sugar Solids, percent | <0.1 | 1.18 | 1.3 |

1 Will not flow.

Example 3.—Confectioner's sugar 100 lbs. of finely ground cane sugar were fed into the agglomerating chamber and brought into a fluidized state by passing heated air through the diffuser at a rate of 55 s.c.f.m. per sq. ft. of diffuser area. 24½ lbs. of a solution consisting of 3.4 lbs. of invert sugar and 21.1 lbs. of water was atomized into the fluidized bed of powdered sugar through atomizing nozzles such as 10 fitted into the sides of the agglomerating chamber as described. The air entering the plenum chamber was controlled at a temperature of 268° F. The temperature of the product in the agglomerating chamber was 170° F.

The product recovered from the agglomerating chamber was sifted through a 28 mesh wire sieve to remove oversized agglomerates and over an 80 mesh wire sieve to remove small agglomerates and powder. The oversize agglomerates were milled in a hammer mill and resifted and the minus 28 plus 80 mesh fraction so obtained was combined with the similar fraction recovered from the first sifting. In this way 65 lbs. of a minus 28 mesh plus 80 mesh product was obtained per 100 lbs. of product recovered from the agglomerating chamber. At least 95% of the final product remained on a 120-mesh screen and the moisture content was less than 1.0%. The balance of the material consisted of small agglomerates mixed with powdered sugar and which in a continuously operated commercial process would be returned to the agglomerating chamber for further processing.

The following table contains the results of tests which demonstrate that the invert sugar solution and powdered sugar were effectively combined to produce a dry, agglomerated, free-flowing, non-caking confectioner's sugar product.

|  | Powdered Sugar Fed into Agglomerating Chamber | Minus 28 plus 80 mesh Product Recovered |
|---|---|---|
| Mesh Analysis: |  |  |
| Plus 20, percent | 0 | 0 |
| Plus 40, percent | 0 | 19.6 |
| Plus 60, percent | 0 | 49.5 |
| Plus 80, percent | 0 | 21.7 |
| Plus 100, percent | 0 | 5.6 |
| −100, percent | 100 | 3.6 |
| Bulk Density, gms./cc | 0.56 | 0.41 |
| Moisture, percent | 0.05 | 0.35 |
| Invert Sugar, percent | <0.05 | 3.6 |
| Ash, percent | <0.05 | 0.013 |
| Flowability, seconds | (1) | 7.5 |

1 Would not flow.

To demonstrate the performance, as a confectioner's sugar, of the product produced in this example two lots of cake-frosting were prepared using a standard recipe for butter icing. In the first lot the minus 28 plus 80 mesh product recovered from the above test was used and in the second lot standard commercial icing sugar as sold on the retail market was used. Both lots of icing were smooth and glossy and in every way identical demonstrating that although the product produced by the process described was agglomerated to yield a free-flowing and non-caking confectioner's sugar, the agglomerates disintegrate and disperse when used in typical applications to produce confectioner's products comparable to those made from powdered sugar. By comparison with the standard commercial icing sugar, however, the agglomerated product had an excellent storage life, retaining its flowability and non-caking characteristics for indefinitely long periods of time.

Example 4.—Flavored flour product 100 lbs. of wheat flour was fed into the agglomerating chamber and fluidized by passing air through the diffuser at a rate of 60 s.c.f.m. per sq. ft. of diffuser area. 90 lbs. of a solution consisting of 13.6 lbs. hydrolyzed vegetable protein, 10.2 lbs. sodium chloride, 5.1 lbs. monosodium glutamate, 2 lbs. cane sugar, 5.1 lbs. caramel color and 54 lbs. of water was atomized into the fluidized bed over a period of 160 minutes. The temperature of the air entering the chamber was 242° F. and the temperature of the product in the bed was 117° F. At least 95% of the finished product remained on a 120-mesh screen, the moisture content was less than 10.0%, 0 to 10.0% of monosodium glutamate was present along with 2 to 20% of chlorides expressed as NaCl.

The following tests and analysis of the flour fed into the agglomerating chamber and the product discharged from the chamber demonstrate that the ingredients contained by the solution which was atomized into the fluidized bed were combined with the flour to form a dry, free-flowing, readily dispersible, non-caking, dust-free, agglomerated product.

|  | Flour Fed in Chamber | Product Recovered from Chamber |
|---|---|---|
| Mesh Analysis: |  |  |
| +40, percent | 0 | 58.1 |
| −40+120, percent | 3 | 40.9 |
| −120, percent | 97 | 1.0 |
| Moisture, percent | 12.8 | 5.0 |
| Monosodium Glutamate, percent | 0 | 5.95 |
| Chlorides as Sodium Chloride, percent | 0.11 | 14.6 |
| pH | 5.5 | 5.6 |
| Dispersing Time | (1) | (2) |
| Flowability, sec | (3) | 5.0 |

[1] 2 minutes.
[2] 3 seconds.
[3] Would not flow.

The product produced by the above example according to the invention has been found to be very useful as a gravy base or gravy maker. When combined with fat such as meat drippings, shortening, butter or margarine, for example, and water and then heated to boiling for about one minute a very appetizing and palatable gravy or sauce for meat dishes is obtained. In addition the product has many other useful applications in meat dishes such as a thickener and flavor enhancer for stews, meat pies, meat loaves, etc.

The flour contained by the product acts as an effective thickening agent in these applications while the other ingredients enhance the flavor and color. Of particular importance is the non-caking properties of the product which results from the absence of fine particles. That property results in excellent shelf stability unobtainable in an unagglomerated combination of such ingredients. The excellent free-flowing properties of the product provides convenience in the form of easy measurement. Of even more importance is the added convenience in use resulting from the excellent wetting and dispersing properties of the product which makes it possible to combine it with liquids without forming lumps.

Example 5.—Whole milk product

Whole milk powder which had been spray dried less than 24 hours prior to processing was agglomerated in this test. 200 lbs of the powder were fed to the agglomerating chamber. The material in the agglomerating chamber was maintained in a fluidized state by passing heated air at a temperature which varied between 175° F. and 205° F. through the diffuser at a rate of 64 s.c.f.m. per sq. ft. of diffuser area. As the agglomerating agent 60 lbs. of condensed whole milk liquid having a solids content of 40% by weight were atomized into the fluidized bed over a period of 3 hours, the condensed whole milk being prepared by evaporating water from liquid whole milk in a multiple effect vacuum evaporator until a solids content of 40% was obtained. The temperature of the product in the agglomerating chamber varied between 126° F. and 136° F. during the period of the run.

The product discharged from the chamber was sifted through a 16 mesh wire sieve to remove oversized agglomerates and over an 80 mesh sieve to remove undersized agglomerates and powder. 73 lbs. of minus 12 plus 80 mesh product along with 7 lbs. of oversized agglomerates and 20 lbs. of fines per 100 lbs. of product discharged from the chamber were recovered. In commercial process, on a continuous basis, the oversize agglomerates would be milled and resifted and the fines would be returned to the agglomerating chamber for further agglomeration. At least 75% of the final product remained on a 100-mesh screen and the moisture content was less than 5.0%.

The following test results demonstrate that the whole milk powder fed into the agglomerating chamber and the liquid condensed whole milk were combined, by the process according to the invention, to form a dry, agglomerated, free-flowing whole milk product with wetting propperties superior to those of the spray dried whole milk powder before it was agglomerated.

|  | Powered Whole Milk Fed to Agglomerating Chamber | Minus 12-80 Mesh Product Recovered |
|---|---|---|
| Mesh Analysis: |  |  |
| 12, percent | 0.0 | 0.0 |
| 20, percent | 0.0 | 3.1 |
| 40, percent | 0.0 | 11.9 |
| 60, percent | 1.1 | 26.0 |
| 80, percent | 7.6 | 22.9 |
| 100, percent | 45.4 | 11.7 |
| −100, percent | 45.9 | 24.4 |
| Moisture, percent | 1.8 | 3.3 |
| Bulk Density, gms./cc | 0.37 | 0.39 |
| Flowability,[1] seconds | (2) | 11 |
| Dispersing time,[3] seconds | (4) | 15 |
| Fat | 26.6 | 26.3 |
| Acidity | 0.125 | 0.125 |
| Solubility, cc | 0.4 | 1 |
| Gas Analysis, percent | 0.18 | 0.20 |

[1] 50 grams used because funnel would not hold 100 grams due to the low bulk density of the material.
[2] Would not flow through funnel.
[3] Because of the high fat content of the product, water at 125° F. was used in order to reduce the wetting time to a practical and reproducible length of time.
[4] More than 5 minutes.

Example 6.—Skim milk product 100 lbs. of spray dried skim milk powder were placed in the agglomerating chamber and fluidized by passing heated air through the diffuser at a rate of 40 s.c.f.m. per sq. ft. of diffuser area. 32 lbs. of liquid condensed skim milk having a solids content of 40% by weight was atomized into the fluidized bed over a period of 60 minutes through a series of two-fluid nozzles 10 located, as described, in the sides of the agglomerating chamber. The condensed skim milk liquid was prepared by concentrating liquid skim milk in a triple effect vacuum evaporator to a solids content of 40% by weight. The temperature of the air entering the plenum chamber below the diffuser was 248° F. and the temperature of the product in the agglomerating chamber was 121° F.

At least 95% of the finished product remained on a 100-mesh screen and the moisture content was less than 5.0%. The results of several tests given below demonstrate that the skim milk powder and liquid condensed milk were combined to form a dry, free-flowing, readily dispersible agglomerated milk product.

|  | Powdered Skim Milk Fed Into Agglomerating Chamber | Products Recovered From The Agglomerating Chamber |
|---|---|---|
| Mesh Analysis: |  |  |
| +12, percent | 0 | 3.2 |
| −12+20, percent | 0 | 19.3 |
| −20+40, percent | 0 | 20.9 |
| −40+60, percent | 0 | 28.2 |
| −60+80, percent | 0.7 | 16.8 |
| −80+100, percent | 1.4 | 6.4 |
| −100, percent | 97.9 | 5.2 |
| Dispersibility, seconds | (1) | 5 |
| Bulk Density, gms./cc | .50 | .36 |
| Flowability, seconds | (2) | 6.0 |
| Moisture, percent | 3.1 | 3.2 |

[1] More than 5 minutes.
[2] Would not flow out of funnel.

Example 7.—Cheese product 200 lbs. of dried cheese powder, prepared by spray drying a mixture of cheddar cheese, concentrated liquid skim milk, and concentrated liquid whey, the mixture containing 40% solids by weight and the proportion of each ingredient being such that the solids consisted of 2 parts cheddar cheese solids, one part skim milk solids and one part whey solids, was fed into the agglomerating chamber and fluidized by passing heated air through the diffuser at a rate of 65 s.c.f.m. per sq. ft. of diffuser area. 31 lbs. of water was atomized into the fluidized bed of the powdered mixture through nozzles fitted into the sides of the agglomerating chamber as described. The time required was 3 hours and 55 minutes. The temperature of the air entering the plenum chamber below the diffuser was 216° F. and the temperature of the product in the agglomerating chamber was 134° F.

The product discharged from the chamber was sifted through a 12 mesh wire sieve to remove oversized agglomerates and over an 80 mesh wire sieve to remove small agglomerates and powder. In this way a minus 12 plus 80 mesh fraction amounting to 64.4 lbs. per 100 lbs. of material discharged from the agglomerating chamber was recovered. The remainder consisted of 2.5 lbs. of oversized agglomerates, which in commercial practice would be milled to a size which would pass through a 12 mesh sieve and then returned to the sifter or to the agglomerating chamber, and 33.1 lbs. of small agglomerates and powder which in commercial practice would be returned to the agglomerating chamber for further processing.

At least 80% of the finished product remained on a 100-mesh screen and the moisture content was less than 3.0%. As indicated by the test results given below the minus 12 plus 80 mesh fraction which was recovered was dry, agglomerated, free-flowing and readily dispersible.

|  | Powdered Cheese Fed Into Agglomerating Chamber | Minus 12 Plus 80 Mesh Product Recovered |
|---|---|---|
| Mesh Analysis: |  |  |
| Plus 12, percent | 0.0 | 0.0 |
| Plus 20, percent | 0.4 | 4.8 |
| Plus 40, percent | 0.3 | 11.8 |
| Plus 60, percent | 0.4 | 20.0 |
| Plus 80, percent | 0.2 | 25.0 |
| Plus 100, percent | 0.8 | 16.9 |
| Minus 100, percent | 97.9 | 21.5 |
| Moisture, percent | 2.8 | 3.0 |
| Bulk Density, gms./cc | 0.39 | 0.33 |
| Flowability,¹ seconds | (²) | 8.0 |
| Dispersibility,³ seconds | (⁴) | 30 |

¹ 50 grams used because funnel would not hold 100 grams due to the low bulk density of the material.
² Would not flow through funnel.
³ Because of the high fat content of the product, water at 125° F. was used in order to reduce the wetting time to a practical and reproducible length of time.
⁴ More than 5 minutes.

Example 8.—Starch product

Referring to FIGURE 1, powdered wheat starch was introduced into chamber 2 and fluidized by passing air through pump 8, heater 9, and diffuser 5 at a rate of 40 s.c.f.m. per sq. ft. of diffuser area. A 3% solution of gelatinized wheat starch to serve as a bonding agent, was introduced into the chamber through atomizing nozzle 10 at the rate of 40 lbs. per 100 lbs. of starch fed into the chamber. The fluidizing air leaving heater 9 was controlled at an average temperature of 258° F. The average temperature of the material in chamber 2 was 111° F. The product discharged from chamber 2 had the following mesh analysis, moisture content and bulk density compared with the powdered wheat starch fed into it:

|  | Powdered Wheat Starch Fed Into Chamber 2 | Agglomerated Product Discharged from Chamber 2 |
|---|---|---|
| Mesh Analysis: |  |  |
| +40 mesh, percent | 0 | 20.0 |
| −40+120 mesh, percent | 0 | 56.4 |
| −120 mesh, percent | 100 | 23.6 |
| Moisture Content, percent | 11.6 | 12.4 |
| Bulk Density, gms./cc | 0.59 | 0.50 |
| Flowability, seconds | (¹) | 8.5 |

¹ Only a portion would flow out.

By fitting sifter 15 with sieves having appropriate sized openings, a product can be recovered at 17 with a minimum particle size anywhere from 120 up to 40 mesh. The product so recovered is extremely free-flowing, almost dustless, and very easily dispersed in water. Laboratory examination showed that the agglomerates wetted readily and disintegrated quickly when dispersed in water at room temperature to form a slurry of individual starch granules. Upon cooking, the slurry was found to have viscosity properties, identical with the powdered starch fed into chmaber 2.

Example 9.—Dextrine

Highly soluble dextrines are usually finely powdered materials which are sticky and immobile and in spite of their high solubility frequently are difficult to disperse in water at rom temperature without forming lumps. The particular dextrine processed in this example was a yellow wheat dextrine which was 95% soluble in water at 68° F.

100 lbs. of the dextrine were fed into the agglomerating chamber and brought into a fluidized state by admitting heated air to the chamber through the diffuser at a rate of about 55 s.c.f.m. per sq. ft. of diffuser area. 27.5 lbs. of water was atomized into the fluidized bed over a period of 110 minutes through atomizing nozzles such as 10, fitted into the sides of the agglomerating chamber as described. The air entering the plenum chamber was controlled at a temperature of 225° F. The temperature of the product in the agglomerating chamber varied between 110° and 130° F.

The product recovered from the agglomerating chamber was sifted through a 12 mesh wire sieve to remove oversized agglomerates and over an 80 mesh wire sieve to remove small agglomerates and powder. 5½ lbs. of oversized agglomerates, 66 lbs. of minus 12 plus 80 mesh product and 28½ lbs. of fines were recovered per 100 lbs. of material withdrawn from the chamber. In a continuously operated commercial installation the oversized agglomerates would be milled to approximately the size desired in the finished product and returned to the agglomerating chamber with the fines or returned to the sifter directly. About 95% of the finished product will remain on a 100-mesh screen and the moisture content is less than 7.0%.

The following table contains the results of tests which demonstrate that the powdered dextrine fed into the chamber was transformed into a free-flowing, relatively dust free agglomerated dextrine product easily wetted and readily dispersible in water.

|  | Dextrine Fed into Chamber | Minus 12 Plus 80 Mesh Product Recovered |
|---|---|---|
| Mesh Analysis: |  |  |
| Plus 12, percent | 0 | 0 |
| Plus 20, percent | 0 | 10.7 |
| Plus 40, percent | 0 | 29.4 |
| Plus 60, percent | 0 | 27.9 |
| Plus 80, percent | 0 | 17.6 |
| Plus 100, percent | 0.5 | 9.3 |
| Minus 100, percent | 99.5 | 5.1 |
| Moisture, percent | 3.7 | 6.1 |
| Bulk Density, gms./cc | 0.43 | 0.36 |
| Flowability, seconds | (¹) | 9 |
| Dispersing Time, seconds | (²) | 2 |
| pH | 3.6 | 3.6 |

¹ Would not flow through funnel.
² More than 5 minutes.

Dextrines are manufactured by adding acids such as hydrochloric acid to powdered starch and heating the acidified starch to temperatures up to 400° F. over a period of several hours. During this heating most of the water contained by the starch is driven off resulting in a finished dextrine containing very little moisture. It is known to those familiar with the art that dextrines perform better when allowed to age or mature and regain moisture following manufacture and before being used for such purposes as the preparation of adhesives. This maturing process and regaining of moisture is normally a rather slow process and is frequently carried out by simply storing dextrine in bags in a warehouse for a period of several weeks. It is further known that this maturing process can be hastened by replacing the moisture in the dextrine. With the process of this invention it is possible to produce a product at almost any desired moisture content by suitably adjusting certain variables, particularly the temperature to which the fluidizing air is heated. The process, therefore, provides a means, not only of obtaining an agglomerated dextrine product with the advantages referred to earlier, but also and simultaneously provides a means for adding moisture to dextrines which helps speed up the normal maturing process and regaining in the finished product of the loss in yield which occurs as a result of the moisture loss during dextrinization.

Example 10.—Confectioner's sugar 117 lbs. of finely ground (90% through 325 mesh) cane sugar were fed into the agglomerating chamber and brought into fluidized state by passing heated air through the diffuser at a rate of 100 s.c.f.m. per sq. ft. of diffuser area. 43 lbs. of a solution consisting of 11.7 lbs. of invert sugar, 5.5 lbs. of sucrose and 25.8 lbs of water was atomized into the fluidized bed of powdered sugar over a period of 105 minutes, through atomizing nozzles such as 10 fitted into the sides of the agglomerating chamber as described. The air entering the plenum chamber was controlled at a temperature of 267° F. The temperature of the product in the agglomerating chamber was 147° F.

The material withdrawn from the agglomerating chamber was sifted through a 12 mesh sieve to remove oversized agglomerates and over an 80 mesh sieve to remove small agglomerates and powder. In this manner 9 lbs. of oversized agglomerates, 71.5 lbs. of minus 12 plus 80 mesh product and 19.5 lbs. of fines were recovered per 100 lbs. of material withdrawn from the chamber. In a continuously operated commercial process the oversized agglomerates would be milled to approximately the size desired in the finished product and returned to the agglomerating chamber with the fines for further processing.

The following table contains the results of tests which demonstrate that the solution of invert sugar and sucrose was effectively combined with the powdered sugar to produce a dry, agglomerated, free-flowing, non-caking sugar product at least 90% of which remained on a 120 mesh sieve and moisture content of which was less than 1.0%.

|  | Powdered Sugar Fed Into Agglomerating Chamber | Minus 12 plus 80 mesh Product Recovered |
|---|---|---|
| Mesh Analysis: |  |  |
| Plus 20 mesh, percent | 0 | 7.2 |
| Plus 40 mesh, percent | 0 | 28.2 |
| Plus 60 mesh, percent | 0 | 41.6 |
| Plus 80 mesh, percent | 0 | 19.5 |
| Plus 100 mesh, percent | 0.3 | 0.2 |
| Minus 100 mesh, percent | 99.7 | 3.3 |
| Bulk Density, gms./cc. | 0.56 | 0.51 |
| Moisture, percent | 0.04 | 0.28 |
| Invert Sugar | <.05 | 9.1 |
| Flowability, seconds | (¹) | 5.0 |

¹ Would not flow.

Example 11.—Enriched wheat flour

The apparatus as shown in FIGURE 2 was used in a typical run to process 500 lbs. of all purpose, top patent enriched wheat flour having a moisture content of 14%.

Operating conditions were:

| | |
|---|---|
| Airflow rate _______________s.c.f.m__ | 120 |
| Temperature of inlet air _________° F.__ | 300 |
| Temperature of outlet air ________° F.__ | 110–117 |
| Flour feed rate __________lb. per hour__ | 100 |
| Water feed rate ________gal. per hour__ | 2 |

The temperature of the outlet air is shown as 100°–117° F. but it is pointed out that in actual practice the objective is to maintain the lowest possible temperature and it has been found that the bed temperature can satisfactorily be maintained at about 110° F. to about 112° F.

The material from the agglomerating chamber 102 (500 lbs.) had the following sieve analysis:

| | lbs. |
|---|---|
| +40 mesh (U.S. Standard) | 76 |
| −40+120 mesh | 253 |
| −120 mesh | 171 |

The coarse material (+40 mesh) was pulverized to give a material having the following sieve analysis:

| | |
|---|---|
| +40 mesh | 1 |
| −40+120 mesh | 67 |
| −120 mesh | 8 |

| | lbs. |
|---|---|
| Total yield of product (−40+120 mesh) (64%) | 329 |
| Fine material to reprocess (−120) (35.8%) | 179 |
| Coarse (+40) (0.2%) | 1 |

The moisture content of the product was 14%.

That the final product retains its original chemical and the desired technical properties and is changed only in certain desirable physical characteristics is demonstrated by the following table. This table compares certain relevant properties of the aggregated flour with those of the original conventional flour.

COMPARISON OF PROPERTIES OF AGGREGATED TOP PATENT AND REGULAR TOP PATENT FLOURS

|  | Aggregated | Regular |
|---|---|---|
| Moisture (percent) | 14.0 | 14.0. |
| Protein (percent) | 11.8 | 11.8. |
| Ash (percent) | 0.36 | 0.36. |
| K.J. Colour Value | −0.3 | −0.3. |
| Enrichment | Normal | Normal. |
| Gassing Power (4 and 6 hr.), mm | 400/470 | 420/510. |
| Bulk Density: |  |  |
| (G./cc.) | 0.48 | 0.50. |
| (G./cup) | 117 | 122. |
| Dispersibility ¹ (min.) | 10 sec | 2 min. |
| Dispersion | Uniform | Lumpy. |
| Mesh Analysis, percent (U.S. Standard Sieves): |  |  |
| On 40 | 0 | 0. |
| On 60 | 19.6 | 0. |
| On 80 | 18.8 | 0. |
| On 100 | 30.0 | 3.6. |
| On 120 | 25.5 | 10.0. |
| On 150 | 2.0 | 35.4. |
| Through 150 | 4.1 | 51.0. |
| Farinograph: |  |  |
| Curve | Normal | Normal. |
| Absorption (percent) | 60.4 | 62.1. |
| D.D.f. (min.) | 5 | 5. |
| P.T. (min.) | 6 | 6. |
| M.T.I. (min.) | 30 | 30. |
| Stability (B.U.) | 12 | 12. |
| Extensograph: |  |  |
| Curve | Normal | Normal. |
| Resistance (180 min.) | 550 | 550. |
| Area (180 min.) | 29.6 | 27.4. |
| Amylograph: |  |  |
| Curve | Normal | Normal. |
| Peak Viscosity (B.U.) | 570 | 510. |
| Bread Baking: |  |  |
| Volume (cc.) | 3,375 | 3,375. |
| Shred | Normal | Normal. |
| Texture | do | Do. |
| Crumb Colour | do | Do. |
| Pastry | do | Do. |
| Cake | Normal in all respects. | Do. |
| Crusty Rolls | Normal | Do. |
| White Sauce | No lumps | Lumpy. |
| Lemon Pie Filling | Good | Good. |

¹ Dispersibility=Time required for 1 teaspoon of material to sink below the water surface in a 400 ml. beaker containing 250 ml. of tap water at room temperature.

The products produced according to the invention and the methods of producing them as described and illustrated in the examples are uniquely designed to offer the consumer the maximum in flavor, adaptability, ease of handling and storage qualities. The excellent characteristics of the products are the direct result of the novel methods by which they are made including a single-stage method of production, imaginative preparation and use of initial materials and the provision of specific agglomerating materials, liquids solutions and suspensions, designed not simply to agglomerate particulate substances but, in many instances to imrpove and enhance the agglomerates from the standpoint of flavor, nutritive value and utility.

What is claimed is:

1. A process for preparing free-flowing, readily-wettable, readily-dispersible and/or soluble products from more finely-divided, non-free-flowing solid materials comprising placing a body of said non-free-flowing material in a chamber, conducting a heated, fluidizing gas upwardly through said body of material and transforming it into a particulate fluidized bed, atomizing an atomizable, fluid, agglomerating agent to droplets substantially all of which are in the range of about 10 to 250 microns directly in the fluidized bed by injecting at least one stream of said agglomerating agent and a gas jet surrounding said stream directly into said bed intermediate the upper and lower limits thereof, said jet being directed generally transversely of the flow of fluidizing gas, thereby wetting and agglomerating the particles in the bed, said agglomerates being dried by the heated gas and being continuously removed from the chamber, the wetting of the particles, the agglomeration, and the drying of the agglomerates comprising a substantially instantaneous sequence of steps.

2. The process according to claim 1 in which the temperature of the fluidizing gas entering the chamber is in the range of about 175° F. to about 400° F.

3. The process according to claim 2 in which the temperature of the bed is in the range of about 110° F. to about 170° F.

4. The process according to claim 2 in which the rate of flow of the fluidizing gas is in the range of about 40 to about 100 s.c.f.m. per sq. ft. of diffuser plate area.

5. The process according to claim 1 in which the temperature of the fluidizing gas entering the chamber is in the range of about 175° F. to about 290° F., the temperature of the bed is in the range of about 110° F. to about 170° F. and the rate of flow of the fluidizing gas is in the range of about 40 to about 100 s.c.f.m. per sq. ft. of diffuser plate area.

6. The process according to claim 1 in which the fluidizing gas is heated air.

7. The process according to claim 1 in which the more finely divided material is icing sugar and the agglomerating agent is a 50% solution of cane sugar, the temperature of the fluidizing gas entering the chamber being about 221° F. and the temperature of the bed being about 155° F., the moistening and agglomerating of the more finely divided material and the drying of the agglomerates taking place substantially instantaneously.

8. The process according to claim 1, wherein the more finely divided material is powdered sugar and the agglomerating agent is refinery syrup, the temperature of the fluidizing gas entering the chamber being about 288° F. and the temperature of the bed being about 159° F., the moistening and agglomerating of the more finely divided material and the drying of the agglomerates taking place substantially instantaneously.

9. The process according to claim 1, wherein the more finely divided material is finely ground cane sugar and the agglomerating agent is an aqueous solution of invert sugar, the temperature of the fluidizing gas entering the chamber being about 268° F. and the temperature of the bed being about 170° F., the moistening and agglomerating of the more finely divided material and the drying of the agglomerates taking place substantially instantaneously.

10. The process according to claim 1 in which the more finely divided material is wheat flour and the agglomerating agent is an aqueous solution containing hydrolyzed vegetable protein, sodium chloride, monosodium glutamate, cane sugar and coloring matter, the temperature of the fluidizing gas entering the chamber being about 242° F. and the temperature of the bed being about 117° F., the moistening and agglomerating of the more finely divided material and the drying of the agglomerates taking place substantially instantaneously.

11. The process according to claim 1 in which the more finely divided material is whole milk powder and the agglomerating agent is condensed whole milk liquid, the temperature of the fluidizing gas entering the chamber being between about 175° F. and 205° F. and the temperature of the bed being between about 126° and 136° F., the moistening and agglomerating of the more finely divided material and the drying of the agglomerates taking place substantially instantaneously.

12. The process according to claim 1 in which the more finely divided material is skim milk powder and the agglomerating agent is liquid condensed milk, the temperature of the fluidizing gas entering the chamber being about 248° F. and the temperature of the bed being about 121° F., the moistening and agglomerating of the more finely divided material and the drying of the agglomerates taking place substantially instantaneously.

13. The process according to claim 1 in which the more finely divided material is cheese powder and the agglomerating agent is water, the temperature of the fluidizing gas entering the chamber being about 216° F. and the temperature of the bed being about 134° F., the moistening and agglomerating of the more finely divided material and the drying of the agglomerates taking place substantially instantaneously.

14. The process according to claim 1 in which the more finely divided material is powdered wheat starch and the agglomerating agent is an aqueous solution of gelatinized wheat starch, the temperature of the fluidizing gas entering the chamber being about 258° F. and the temperature of the bed being about 111° F. the moistening and agglomerating of the more finely divided material and the drying of the agglomerates taking place substantially instantaneously.

15. The process according to claim 1 in which the more finely divided material is powdered dextrine and the agglomerating agent is water, the temperature of the fluidizing gas entering the chamber being about 225° F. and the temperature of the bed being within the range of about 110° F. and 130° F., the agglomerating agent being introduced into the fluidized bed at the rate of about 15 pounds/hour, the moistening and agglomerating of the more finely divided material and the drying of the agglomerates taking place substantially instantaneously.

16. The process according to claim 1 in which the particulate material is wheat flour, the temperature of the fluidizing gas entering the chamber being about 300° F., the temperature of the bed being not lower than about 110° F. to about 112° F., the agglomerating agent being introduced into the fluidized bed at the rate of about 2 gallons per 100 lbs. of flour processed, the moistening and agglomerating of the more finely divided material and the drying of the agglomerates taking place substantially instantaneously.

17. A free-flowing, non-caking, readily-dispersible brown sugar consisting essentially of non-fused, loosely bonded, open-structured agglomerates prepared by the method of claim 1 in which said more finely divided material is powdered sugar and said agglomerating agent is yellow refinery syrup, the agglomerated product having a moisture content of less than 1.0% and a flowability of about 6 seconds, and at least 95% of the agglomerates being greater than 120 mesh size.

18. A free-flowing, non-caking, readily-dispersible confectioner's sugar consisting essentially of non-fused, loosely bonded, open-structured agglomerates prepared by the method of claim 1 in which said more finely divided material is cane sugar and said agglomerating agent is a solution of invert sugar, the agglomerated product having a moisture content of less than 1.0% and a flowability of about 7 seconds, and at least 95% of the agglomerates being greater than 100 mesh size.

19. A free-flowing, non-caking readily dispersible flavored flour product consisting essentially of non-fused, loosely-bonded, open-structured agglomerates prepared by the method of claim 1 in which said finely divided material is a dried material including flour and said agglomerating agent is a solution or dispersion of at least one member of the group consisting of hydrolyzed vegetable protein, sodium chloride, monosodium glutamate, sugars, gums, milk, cheese, fat, emulsifiers, thickeners, colors, natural and artificial flavors, pigments, spices and nutritive additives, 90% of the agglomerates being larger than 120 mesh, having a moisture content of less than 10% and flowability less than 10 seconds.

20. A free-flowing, non-caking readily-dispersible whole milk powder consisting essentially of non-fused, loosely-bonded, open-structured agglomerates prepared by the method of claim 1 in which said more finely divided material is milk powder and said agglomerating agent is condensed whole milk, the agglomerated product having a moisture content of less than 2.0% and a flowability of about 11 seconds, and at least 75% of the agglomerates being greater than 120 mesh size.

21. A free-flowing, non-caking, readily-dispersible cheese product consisting essentially of non-fused, loosely-bonded, open-structured agglomerates prepared by the method of claim 1 in which said more finely divided material is a dried powdered mixture of cheese and at least one member of the group consisting of concentrated liquid skim-milk and concentrated liquid whey and said agglomerating agent is water, the agglomerated product having a moisture content of less than 3.0% and a flowability of about 8 seconds, and at least 80% of the agglomerates being greater than 100 mesh size.

22. A free-flowing, non-caking, readily-dispersible starch product consisting essentially of non-fused, loosely-bonded, open-structured agglomerates prepared by the method of claim 1 in which said more finely divided material is starch and said agglomerating agent is a solution of gelatinized starch, the agglomerated product having a moisture content of less than 15.0% and a flowability of about 8 seconds, and at least 75% of the agglomerates being greater than 120 mesh size.

References Cited

UNITED STATES PATENTS

| | | | |
|---|---|---|---|
| 2,856,290 | 10/1958 | Peebles | 99—139 |
| 3,116,150 | 12/1963 | Baker | 99—94 |
| 3,143,428 | 8/1964 | Reimers et al. | 99—141 |
| 3,207,824 | 9/1965 | Wurster et al. | 264—117 |

FOREIGN PATENTS

| | | |
|---|---|---|
| 1,302,075 | 7/1962 | France. |
| 644,621 | 7/1962 | Canada. |

MAURICE W. GREENSTEIN, *Primary Examiner.*